ns patent Office 3,142,569
Patented July 28, 1964

3,142,569
PROCESS FOR PREPARING POWDERED FOOD-
STUFF CONTAINING FINELY DISPERSED FAT
Jean-Jacques Scheidegger, Geneva, Switzerland, assignor to Koopmans Meelfabrieken N.V., Leeuwarden, Netherlands, a corporation of Dutch law
No Drawing. Filed Oct. 17, 1961, Ser. No. 145,752
Claims priority, application Switzerland Nov. 23, 1960
8 Claims. (Cl. 99—1)

The invention relates to a powdered foodstuff containing finely dispersed fat and a process for preparing the same.

As is known, powdered foodstuffs containing a fat may be dispersed only very poorly in water. These products have a fatty appearance and the suspensions in water prepared with these products are not stable. This manifests itself in a very short time by the formation of a layer of fat at the surface. This occurs particularly with artificial powdered milk, obtained by addition of a fat to skimmed milk powder. Such a product is often used for feeding cattle. Likewise it occurs with milk powder which has been obtained by drying non-homogenized whole milk by atomization.

The above-mentioned disadvantages are due to the fact that the fat is roughly divided at the surface of the non-fatty particles. Upon contact with water these particles, which are more or less enveloped by fat, are poorly wetted. While the soluble substances finally dissolve, the fat bends to form rather big globules and separates off from the solution. To avoid these disadvantages, the fat is dispersed finely in the powder.

The product of the invention meets said requirements and the present invention provides a process for preparing the same. According to the present process, a mixture of the fat and the powdered foodstuff, to which 2 to 15% of water is added, is subjected to the action of a mill operating at high speed, so that the fat is dispersed in the form of fine droplets, after which the mixture is dried in such a way that the moisture content is reduced to less than 5%.

According to the process, therefore, a mixture of the non-fatty powder and the fat is subjected to a rigorous mechanical treatment, such as the action of a hammer mill, in the presence of a small quantity of water. The latter is an essential element of the process.

In the absence of water it is difficult to pass the material through the hammer mill and no fine dispersion of the fat is obtained. During the addition of the fat to a non-fatty powder substantially uninterrupted film of fat forms round the non-fatty particles. If an attempt to break this film is successful, it tends to form again, and consequently dry breaking is useless. If on the other hand the breaking of the film is effected in the presence of water, the forces at the boundary surface prevent the fat conglomerating again. Thus in the course of the successive shocks a division of the film of fat to finer and finer droplets is obtained, which is precisely the object of the process.

The quantity of water to be added before or during the breaking may depend on the nature of the components of the mixture as well as on its initial moisture content. This quantity may vary from 2 to 15%. Thus in the case of a mixture of fat and skimmed milk powder having a moisture content of 5% the quantity of water to be added is about 8%.

If the added quantity of water is very close to the lower limit of 2%, later drying may become superfluous. The heat evolved during the breaking and removed by a strong current of air, which serves for the pneumatic transport of the powder, is sufficient for the removal of the excess of moisture and for the reduction of the moisture content to less than 5% so that the appliance of a special drying treatment may be omitted.

The temperature of the powder at the moment of the treatment should be so high that the fat melts. For fats melting at a low temperature the rise of temperature caused by the heat of friction in the mill is sufficient in this respect. In other cases it may be necessary to preheat the mixture. It is obvious that this problem does not exist when a liquid fat is used.

The breaking treatment may be carried out in any conventional apparatus. The apparatus which has to be used will preferably be a high-speed type, in which the particles are shocked violently and frequently, rather than a type in which the particles are rubbed or crushed.

*Example I*

760 g. of ordinary skimmed milk powder and 240 g. of molten fat are intimately mixed. The moisture content of the mixture amounts to 4%. During the mixing process 80 g. of water is added in the form of fine droplets. Immediately after this, the powder thus moistened is passed through a mill operating at high speed. It is then at once dried under reduced pressure in such a way that the moisture content is reduced to less than 5%. Thus a milk powder directly ready for use is obtained, in which the fat is dispersed in a way that is comparable with the dispersion of butterfat in milk powder prepared from homogenized whole milk.

*Example II*

880 g. of ordinary skimmed milk powder, which may contain additions such as mineral salts and vitamins, is intimately mixed with 120 g. of lard, which may contain vitamins and an emulsifier. The moisture content of the mixture amounts to 5%. Under continuous stirring, 80 g. of water is added in the form of saturated steam. The powder treated in this way is passed immediately through a mill operating at high speed, and subsequently is at once dried in a current of air in such a way that the moisture content is reduced to less than 5%. An artificial milk powder immediately ready for use is obtained, which may be used for feeding cattle. The fat in said product is dispersed in a way that is comparable with that of homogenized whole milk.

The milk powders prepared according to the two above examples have a finely granular appearance. In the dry state they do not tend to clot together, not even under the influence of moderate pressure. They are readily wetted, even in cold water. The fat is in a dispersed state, so that the reconstituted milk obtained with this powder remains homogeneous for several hours.

The two above examples relate to the application of the process according to the invention for the preparation of whole milk powder by the dispersion of a fat in skimmed milk powder. The process may also be applied for the preparation of milk powder, starting from non-homogenized whole milk. It is sufficient to apply the process to the non-homogeneous mixture that is obtained by drying milk by atomization.

It will of course be obvious that the process may be applied for the dispersion of fats in other powdered foodstuffs, such as certain types of flour, dried soups, etc.

*Example III*

800 g. wheat flour (or a mixture of wheat, barley and rye flour) are intimately mixed with 250 g. of molten fat. The moisture content of this mixture is 8–10%. Mixing being continued 80 g. of water are added in the form of fine droplets and in such a way that not too large agglomerates are formed. The moistened product is immediately passed through a fast working kneading machine and then the excess of moisture is removed in a current of air in such a way that the final moisture content does not exceed 8%.

Thus the flour and the fat are perfectly dispersed and the sauces prepared from this product will be smooth and will not show dispersion defects of the fatty material.

*Example IV*

A mixture for a thick vegetable soup comprising the following ingredients 190 g. flour
    50 g. powdered potato
    290 g. tomato powder
    2 g. lecithin
    168 g. skimmed milk
    70 g. sodium chloride
    10 g. glutamate
    40 g. sugar is mixed with 180 g. of molten fat. Mixing being continued 100 g. of water are added in the form of fine droplets.

Subsequently, the thus moistened powder is passed through a fast working kneading machine, then it is dried in a current of air, in order to decrease the moisture content in such a way that it will be lower than 5%.

What I claim is:

1. A process for the preparation of a powdered foodstuff in which fat is dispersed, characterized in that a mixture of the fat and a powdered foodstuff, said mixture containing from 5 to 25 percent fat, to which 2 to 15% of water is added, is subjected to a grinding action so that the fat is dispersed in the form of fine droplets, after which the mixture is dried in such a way that the moisture content is reduced to less than 5%.

2. A process according to claim 1, characterized in that a whole milk powder is prepared.

3. A process according to claim 1, characterized in that water is added before the mixture is introduced into the mill.

4. A process according to claim 1, characterized in that water is added during the introduction of the mixture into the mill.

5. A process according to claim 1, characterized in that a mixture of a vegetable fat and skimmed milk powder is subjected in the presence of 2 to 15% of water to a grinding action and the mixture is subsequently dried, so that the moisture content is reduced to less than 5%.

6. A process according to claim 1, characterized in that a mixture of milk powder and fat, obtained by drying non-homogenized whole milk by atomization, in the presence of 2 to 15% of water is subjected to a grinding action, after which the mixture is dried in order to reduce the moisture content to less than 5%.

7. A process according to claim 1 characterized in that a mixture of an animal fat and skimmed milk powder is subjected in the presence of 2 to 5% of water to a grinding action and the mixture is subsequently dried, so that the moisture content is reduced to less than 5%.

8. A process according to claim 1 characterized in that a mixture of a vegetable fat and an animal fat is subjected with skimmed milk powder in the presence of 2 to 5% of water to a grinding action and the mixture is subsequently dried, so that the moisture content is reduced to less than 5%.

References Cited in the file of this patent

UNITED STATES PATENTS

| | | |
|---|---|---|
| 742,322 | Hopkins | Oct. 27, 1903 |
| 762,277 | Campbell | June 14, 1904 |
| 1,125,692 | Kitchen | Jan. 19, 1915 |
| 1,584,126 | North | May 11, 1926 |
| 1,816,339 | Musher | July 28, 1931 |
| 1,958,295 | Christensen et al. | May 8, 1934 |
| 2,319,362 | Wouters | May 13, 1943 |
| 2,554,143 | Hinz et al. | May 22, 1951 |
| 2,611,706 | Bernhart et al. | Sept. 23, 1952 |
| 3,065,076 | Wenner et al. | Nov. 20, 1962 |